Figure 1:
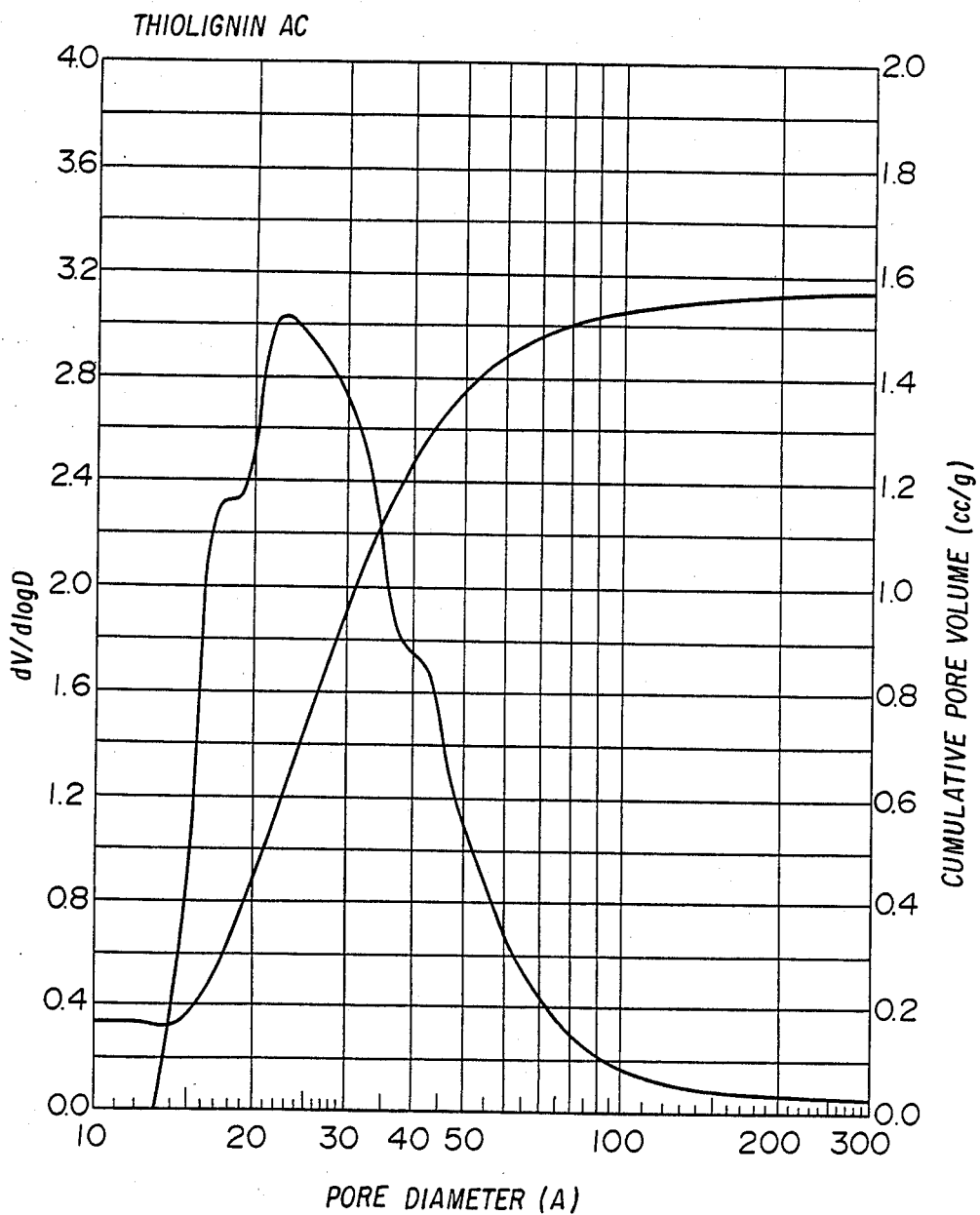

United States Patent [19]

Yamaguchi

[11] Patent Number: 4,937,223
[45] Date of Patent: Jun. 26, 1990

[54] PROCESS FOR PREPARING ACTIVATED CARBON

[75] Inventor: Tatsuaki Yamaguchi, Tokyo, Japan

[73] Assignee: Mitsubishi Kasei Corporation, Tokyo, Japan

[21] Appl. No.: 310,070

[22] Filed: Feb. 10, 1989

[30] Foreign Application Priority Data

Feb. 10, 1988 [JP] Japan .................................. 63-27736

[51] Int. Cl.$^5$ ........................ C01B 31/12; B01J 20/20
[52] U.S. Cl. ..................................... 502/427; 502/437
[58] Field of Search ............................... 502/427, 437

[56] References Cited

U.S. PATENT DOCUMENTS

| | | | |
|---|---|---|---|
| 2,216,757 | 10/1940 | Scheffler | 502/427 |
| 4,082,694 | 4/1978 | Wennerberg et al. | 423/445 |

OTHER PUBLICATIONS

Studies on Active Carbon Made from Spent Sulfite Liquor (I), P 731.2:U 661.183.2, Sadakichi Kishimoto, Kenji Mori.

J. of the Korean Chemical Society, vol. 20, No. 2, 1976, pp. 153–157, Application of Lignin (I), "Preparation of Active Carbon and Its Adsorptivity" Park, Lee and Lee.

Nippon Kagaku Kaishi, J. of the Chemical Society of Japan, Chemistry and Industrial Chemistry, 1988.

STN International, CA File Search Results, pp. 32, 33, 42, Jan. 17, 1989 ("Microencapsulation of Dispersions of, With Cellulosic Gel Matrix").

Primary Examiner—Paul E. Konopka
Attorney, Agent, or Firm—Oblon, Spivak, McClelland, Maier & Neustadt

[57] ABSTRACT

A process for preparing activated carbon, which comprises adding alkali to lignin or its derivative, followed by heat treatment to obtain activated carbon.

8 Claims, 1 Drawing Sheet

PROCESS FOR PREPARING ACTIVATED CARBON

The present invention relates to a process for readily preparing high performance activated carbon having various applications as adsorbent for various substances.

Activated carbon has been used since long ago as industrial adsorbent. In recent years, its demand has been increased substantially along with the development of the technology for the prevention of public pullution, etc. Activated carbon commercially available at present is prepared from coconut shell, sawdust or coal as the starting material and is generally classified into two types i.e. steam-activated carbon and zinc chloride activated carbon, depending upon the method for activation.

Of the two types of activated carbons, the former requires a high temperature of from 900 to 1,200° C. for its preparation, and the latter has a problem of corrosion or contamination by the reagent. In each case, a high level of technique is required for the preparation, and accordingly the product is rather expensive, which has been pointed out as a problem.

With respect to coconut shell carbon which is one of the main products at present, coconut shell as the starting material is all imported from abroad, and uncertainty in its supply has been pointed out.

On the other hand, when coal is used as the starting material, a difficulty in the treatment of exhaust gas and tar produced as by-products, has been pointed out.

Further, the specific surface area of such commercially available activated carbons has been at a level of about 1,600 m$^2$/g at best. If activated carbon having a larger specific surface area is available, not only the adsorbing properties will be improved, but also it is expected that new applications will be developed.

On the other hand, for the preparation of activated carbon, it has been studied to use lignin or its derivative as starting material. For example, a method for activation with zinc chloride or calcium chloride is known (Kishimoto et al, Journal of Paper and Pulp Technology, 23, 80, 199, 201 (1979)), and a method for carbonizing with concentrated sulfuric acid, followed by activation with air, is known (B. K. Park et al, J. Korean Chem. Soc., 20, 153 (1976)). However, such conventional methods employ a heavy metal or a corrosive substance, or involve a step of heating at a temperature of about 1,000° C., or the heat treating step involves two steps of carbonization and activation. Thus, the above object has not yet been adequately accomplished.

Under the circumstances, the present inventor has conducted extensive researches with an aim to develop a process for efficiently obtain activated carbon having a large specific surface area by using lignin or its derivative as starting material, and as a result, has succeeded in accomplishing the present invention.

Namely, the present invention provides a process for preparing activated carbon, which comprises adding an alkali to lignin or its derivative, followed by heat treatment to obtain activated carbon.

Now, the present invention will be described in detail with reference to the preferred embodiments.

In the accompanying drawing, FIG. 1 shows the pore size distribution and the cumulative pore volume curve of activated carbon obtained in Example 12.

In the process of the present invention, lignin or a lignin derivative is used as starting material for the preparation of activated carbon.

Lignin is a main component constituting the basic structure of the plant body together with cellulose and hemicellulose and is a non-carbohydrate obtainable by removing secondary components such as resin, tannin and ash content from woody plant tissues.

Such lignin is contained in an amount of from 20 to 30% by weight in a wood material, but can hardly be isolated in a non-modified state. Isolation methods are generally clasified into (1) a method wherein lignin is obtained as an insoluble residue, and (2) a method wherein lignin is separated as dissolved.

Industrially, ligin derivatives such as thiolignin obtainable by neutralizing a waste water from pulp making by craft method (sulfate method) and lignin sulfonic acid obtainable by concentrating and drying a pulp digesting solution obtained by sulfite method, are readily available and may suitably be used.

In the present invention, it is also possible to use as starting material a waste liquid or solution containing lignin or its derivative. For example, black liquor as a waste water from pulp making by craft method, may be mentioned. In order to improve the properties of activated carbon to be obtained, it is preferred to add calcium oxide or barium oxide, preferably in the form of an aqueous solution, to such black liquor to precipitate inorganic salts and to use the supernatant as the starting material.

In the process of the present invention, an alkali is added to lignin or its derivative.

Such an alkali may be a hydroxide or carbonate of an alkali metal such as sodium or potassium, or a hydroxide or carbonate of an alkaline earth metal such as calcium, magnesium or barium. However, sodium hydroxide or potassium hydroxide is most suitable from the viewpoint of the cost and effects.

Such an alkali may be in a solid state or in the form of an aqueous solution.

The alkali is used usually from 0.1 to 10 parts by weight, preferably from 1 to 5 parts by weight, relative to one part by weight of lignin or its derivative.

After the addition of the above alkali, lignin or its derivative is subjected to heat treatment to obtain activated carbon.

For example, in a carbonization furnace, a predetermined amount of an aqueous solution of an alkali is added to lignin or its derivative, the mixture is throughly stirred and then heated to distil water off, and then the temperature is further raised to complete carbonization and activation simultaneously. Then, the content is taken out, water is added thereto to recover the alkali, and the residual carbide is throughly washed with water and dried to obtain activated carbon having high performance.

The above heating is conducted usually at a temperature of from 250 to 900° C., preferably from 400 to 650° C., usually for from 0.5 to 48 hours, preferably from 1 to 5 hours, whereby carbonization and activation are carried out simultaneously. For the heat treatment, a carbonization furnace (baking furnace) such as a rotary kiln, may be employed, and the temperature is raised under atmospheric pressure in atmospheric air or in a stream of an innert gas such as nitrogen. Water and decomposed oil distilled during the process of the temperature rise are trapped and recovered by a condensor provided at the outlet. Further, the exhaust gas composed mainly of methane is separately recovered. Industrially, these by-products may be disposed by combustion.

After completion of the above heat treatment, the carbide containing the alkali is left to cool, then taken out from the furnace and pulverized. It is firstly washed with water, and the alkali is recovered from the washed solution. Further, the product is again washed with dilute acid, and this operation is preferably repeated until the pH of the washing solution becomes to be about 7.

Now, the present invention will be described in further detail with reference to Examples. However, it should be understood that the present invention is by no means restricted by such specific Examples.

EXAMPLES 1 TO 10

Lignin sulfonic acid ("Sanexis p-252" containing 60% of lignin sulfonic acid and 36% of a polysaccharide, manufactured by Sanyo-Kokusaku Pulp Co., Ltd.) was mixed with sodium hydroxide or sodium carbonate in a predetermined amount as disclosed in Table 1. The mixture was put into a stainless steel beaker, and the beaker was placed in an iron retort, and heating was continued by an electric furnace to a predetermined temperature at a temperature raising rate of from 2 to 3° C./min. When the temperature reached a predetermined temperature, the mixture was maintained at that temperature for a predetermined period of time. During the process of the temperature rise, the water content was distilled off, and generation of gas was observed. The gas was mainly composed of methane.

Then, the mixture was left to cool, and the obtained carbide was washed with air to recover the alkali, whereby activated carbon was obtained.

The results are shown in Table 1.

The surface area is a BET specific surface area, which was measured by a one point method (nitrogen gas) using "Quantasorb surface measuring apparatus" manufactured by "Quantachrome Company".

TABLE 1

| Example Nos. | Carbonization temp. (°C.) | Alkali/lignin (g/g-lignin) | Carbonization time (hr) | Yield (g/g-ligin) | Specific surface area (m2/g) |
|---|---|---|---|---|---|
| Example 1 | 300 | NaOH 1 | 1 | 0.15 | 350 |
| Example 2 | 400 | NaOH 2 | 1 | 0.07 | 1,070 |
| Comparative Example 1 | 450 | 0 | 1 | 0.40 | 63 |
| Example 3 | 450 | NaOH 1 | 1 | 0.20 | 740 |
| Example 4 | 450 | NaOH 2 | 1 | 0.10 | 1,200 |
| Example 5 | 450 | NaOH 3 | 1 | 0.06 | 1,340 |
| Example 6 | 450 | NaOH 1 | 2 | 0.16 | 1,080 |
| Example 7 | 450 | NaOH 1 | 4 | 0.14 | 1,335 |
| Example 8 | 500 | NaOH 2 | 1 | 0.07 | 1,600 |
| Example 9 | 600 | NaOH 2 | 1 | 0.06 | 1,330 |
| Example 10 | 450 | Na2CO3 1 | 1 | 0.3 | 230 |

EXAMPLES 11 TO 13

To a so-called modified lignin sulfonic acid having the purity of lignin especially improved ("Vanilex RN" manufactured by Sanyo-Kokusaku Pulp Co., Ltd.), sodium hydroxide was added at a weight ratio of 1, followed by carbonization at 450° C. for one hour in the same manner as described above. The specific surface area of activated carbon thus obtained was measured by BET method and found to be 1,850 m$^2$/g. The iodine adsorptivity (JIS K-1474) of this activated carbon was 1,300 mg/g.

Activated carbon was prepared in the same manner as above by using so-called thiolignin ("Indulin AT", manufactured by Westvaco Company) being lignin by craft method, as starting material. The activated carbon had a specific surface area of 2,750 m$^2$/g and iodine adsorptivity of 2,090 mg/g. The pore size restribution of this activated carbon as measured by nitrogen adsorption method (measuring apparatus: "Sorptomatic" manufactured by Carbo-erba Company) is shown in FIG. 1. Namely, pores within a range of from 15 to 100 Å are predominant.

Further, to craft pulp black liquor, a one half amount of calcium oxide was added to precipitate inorganic salts such as calcium sulfate, and by using the supernatant as starting material, activated carbon was prepared in the same manner. The specific surface area of the activated carbon was 710 m$^2$/g.

According to the present invention, high performance activated carbon can be obtained in good yield at a temperature lower than the conventional methods and in a single heating process step by using lignin or its derivative produced in a large amount as a by-product during the pulp making by digestion of wood, as starting material and an alkali as activating agent. It is thereby possible to obtain activated carbon having an extremely large specific surface area. Further, its pore size distribution has a characteristic such that pores having a pore size within a range of from 15 to 100 Å, ar predominant.

We claim:

1. A process for preparing activated carbon, which comprises:
    adding from 0.1 to 10 parts by weight of an alkali to a member selected from the group consisting of (1) thiolignin obtained by the neutralization of waste water from pulp making by the Kraft method, (2) lignin sulfonic acid obtained by concentrating a pulp digesting solution obtained by the sulfite method, and (3) a supernatant obtained by precipitating and removing at least a portion of the inorganic salts present in a waste water obtained from pulp making by the Kraft method; and then
    heat treating the resulting material thereby obtaining an activated carbon product.

2. The process according to claim 1, wherein the alkali is an alkali metal hydroxide.

3. The process according to claim 1, wherein the alkali is sodium hydroxide.

4. The process according to claim 1, wherein the heat treatment is conducted at a temperature of from 300 to 900° C.

5. The process according to claim 1, wherein the specific surface area of the activated carbon is at least 500 m$^2$/g.

6. The process of claim 1, wherein the amount of said alkali ranges from 1 to 5 parts by weight.

7. The process according to claim 1, wherein, in said heat treatment, the lignin derivative is heated to a temperature ranging from 250 to 900° C. for 0.5 to 48 hours.

8. The process according to claim 7, wherein said heat treatment ranges from 400 to 650° C. for 1 to 5 hours.

* * * * *